United States Patent
Kawai et al.

(10) Patent No.: US 7,893,598 B2
(45) Date of Patent: Feb. 22, 2011

(54) DRIVING APPARATUS AND IMAGE PICKUP APPARATUS

(75) Inventors: Sumio Kawai, Hachioji (JP); Junichi Ito, Fuchu (JP)

(73) Assignee: Olympus Imaging Corp., Tokyo (JP)

( * ) Notice: Subject to any disclaimer, the term of this patent is extended or adjusted under 35 U.S.C. 154(b) by 392 days.

(21) Appl. No.: 11/999,643

(22) Filed: Dec. 5, 2007

(65) Prior Publication Data
US 2008/0145042 A1   Jun. 19, 2008

(30) Foreign Application Priority Data

Dec. 15, 2006   (JP) .............................. 2006-338715
Nov. 8, 2007   (JP) .............................. 2007-291313

(51) Int. Cl.
*H01L 41/08* (2006.01)
(52) U.S. Cl. ................................. 310/323.02
(58) Field of Classification Search .................. 396/52, 396/55; 348/208.4, 208.99; 310/323.02, 310/323.12, 323.16, 368
See application file for complete search history.

(56) References Cited

U.S. PATENT DOCUMENTS

| | | | | |
|---|---|---|---|---|
| 3,830,996 | A * | 8/1974 | Ullmann et al. | 219/69.12 |
| 5,326,953 | A * | 7/1994 | Ohnishi et al. | 219/69.12 |
| 5,616,980 | A * | 4/1997 | Zumeris | 310/323.16 |
| 6,747,394 | B2 * | 6/2004 | Johansson et al. | 310/323.02 |
| 6,806,620 | B1 * | 10/2004 | Wischnewskiy | 310/323.02 |
| 7,085,484 | B2 * | 8/2006 | Hara | 396/55 |
| 7,129,621 | B2 * | 10/2006 | Sakano et al. | 310/323.09 |
| 7,265,480 | B2 * | 9/2007 | Sasaki | 310/323.01 |
| 2002/0067105 | A1 * | 6/2002 | Kosaka et al. | 310/323.16 |
| 2005/0253484 | A1 * | 11/2005 | Kishi et al. | 310/323.16 |
| 2009/0002500 | A1 * | 1/2009 | Kawai et al. | 348/208.11 |

FOREIGN PATENT DOCUMENTS

JP   2005-331549   12/2005
JP   2006-067712   3/2006

* cited by examiner

*Primary Examiner*—Mark Budd
(74) *Attorney, Agent, or Firm*—Kenyon & Kenyon LLP (57) ABSTRACT

A driving apparatus including a transducer, a fixing member, and a mobile body is provided. The transducer generates elliptical vibration in a driving part when voltage of a predetermined frequency is applied. The fixing member includes a retaining part which retains the transducer. The mobile body, which is driven by the elliptical vibration of the transducer to move with respect to the fixing member, includes a first mobile body part formed in a desired size; and a second mobile body part which has a sliding part to which the driving part is pressed and contacted, and a guide-receiving part which is provided opposite the sliding part and whose moving direction is guided in engagement with a guiding part of the fixing member, the second mobile body part being of higher rigidity, formed in a smaller size than the first mobile body part, and fixed to the first mobile body part.

8 Claims, 9 Drawing Sheets

DRIVING APPARATUS AND IMAGE PICKUP APPARATUS

CROSS-REFERENCE TO RELATED APPLICATIONS

This application is based upon and claims the benefit of priority from Japanese Patent Application No. 2006-338715, filed on Dec. 15, 2006 and Japanese Patent Application No. 2007-291313, filed on Nov. 8, 2007; the entire contents of which are incorporated herein by reference.

BACKGROUND OF THE INVENTION

1. Field of the Invention

The present invention relates to a driving apparatus which uses an elliptical vibration of a transducer to drive and move a mobile body in a predetermined direction, and an image pickup apparatus, such as a digital camera, which uses the driving apparatus to correct a blurring motion.

2. Description of the Related Art

Conventionally, a camera, for example, is known as an image pickup apparatus having a function of correcting a blurring motion. As the blurring-motion correcting function of the camera, an image stabilizing function is known in which a blurring vibration in a pitch direction of the camera and a blurring vibration in a yaw direction of the camera are detected by using a blurring motion detector such as an angular velocity sensor, and an image pickup element or a part of an image pickup optical system is shifted to negate the blurring motion, based on the detected blur signal, independently in the lateral direction and the vertical direction in a plane perpendicular to an imaging optical axis, so that a blur of an image on an imaging area of the image pickup element is corrected.

In an image stabilizing mechanism which realizes the image stabilizing function, a driving unit which moves, to correct a blurring motion caused by a hand movement, the image pickup element itself or a part of an imaging lens in the lateral direction and the vertical direction in the plane perpendicular to the imaging optical axis is used. To operate by following the blurring motion caused by a hand movement, the driving unit is required to have a high response performance, an accurate driving (a minute driving), and a self-retaining capability by which a position of a mobile body is retained even when a power source is turned off.

In response to such requirements, an image stabilizing mechanism using an impact actuator is disclosed in Japanese Patent Application Laid-Open No. 2005-331549. Further, a vibrational-wave linear motor in which two transducers which generate an elliptical vibration on its surface are pressed with respect to a shaft, and the shaft is linearly driven with respect to the transducers is disclosed in Japanese Patent Application Laid-Open No. 2006-67712. In a driving mechanism using the vibrational-wave linear motor, the shaft having a column shape is relatively moved by the transducers, a lens frame is driven by a protrusion provided to the shaft, and the moving direction of the lens frame is guided and moved by a guiding mechanism provided for the lens frame.

However, though the high response performance, the accurate driving, and the self-retaining capability can be obtained in the image stabilizing mechanism using, as the driving mechanism, the impact actuator disclosed in Japanese Patent Application Laid-Open No. 2005-331549, there is a problem that a high output cannot be obtained in a small size since the driving is realized by using an inertial force. This stabilizing mechanism is not suitable when the driving target is an image pickup unit which is comparatively large and heavy, being integrally formed with a dust-proof filter and the like at an anterior surface of an image pickup element such as a CCD in a camera and the like, for example. To increase a driving force, inertia mass needs to be increased and thereby the size of the driving mechanism itself becomes large. Further, due to a principle that the driving is realized by the inertial force which overcomes a frictional force, there is a fundamental problem that an energy loss is inevitably caused due to a frictional sliding and thereby the efficiency cannot be increased so much.

On the other hand, in the so-called vibrational wave motor using the elliptical vibration of a transducer, the efficiency is high and a large driving force can be obtained easily. Therefore, it can be said that the vibrational wave motor is suitable for driving the image pickup unit or the like which is comparatively large and heavy. However, it is necessary for generating a large driving force to press the transducer with respect to the mobile body with large force. Therefore, when the rigidity of the mobile body is poor, there occur problems that the mobile body yields to the pressing force (since the vibration of the vibrational wave motor is originally as small as about several micro meters, a flexure of only several micro meters matters), the efficiency of the driving mechanism deteriorates, and the driving mechanism becomes inoperative because the driving force is absorbed in an extreme case. To prevent such problems, the column-shaped shaft as the mobile body which directly contacts the transducer is formed to have high rigidity, and is configured to transmit the driving force via a protrusion and to move the lens frame as a target to be actually moved, as shown in Japanese Patent Application Laid-Open No. 2006-67712. In this configuration, there are problems that a mechanism of transmitting the driving force to the lens frame side and a guiding mechanism for the lens frame side are required separately, and the mechanism becomes complicated, large, and heavy. In this respect, the moving target itself such as the lens frame may be configured to have high rigidity and may be directly driven by the elliptical vibration of the transducer. However, since any shape and material have own peculiar resonant frequency, it is necessary, against a demand for downsizing, to make the mechanism grow in size and weight more than necessary to prevent a trouble of causing a peculiar vibration and the like when the elliptical vibration from the transducer is transmitted as the driving force.

SUMMARY OF THE INVENTION

A driving apparatus according to one aspect of the present invention includes a transducer which generates an elliptical vibration in a driving part when a voltage of a predetermined frequency is applied to the transducer; a fixing member including a retaining part which retains the transducer; and a mobile body which is driven by the elliptical vibration of the transducer and moves with respect to the fixing member. In the driving apparatus, the mobile body includes a first mobile body part which is formed in a desired size, and a second mobile body part which has a sliding part to which the driving part is pressed and contacted, and a guide-receiving part which is provided opposite the sliding part and whose moving direction is guided in engagement with a guiding part of the fixing member, the second mobile body part being of higher rigidity, formed in a smaller size than the first mobile body part, and fixed to the first mobile body part.

A driving apparatus according to another aspect of the present invention includes a first transducer which generates an elliptical vibration in a driving part when a voltage of a predetermined frequency is applied; a fixing member including a first retaining part which retains the first transducer; a first mobile body to which the driving part of the first transducer is pressed, whose moving direction is regulated by a guiding part of the fixing member to a first direction, and which is driven by the elliptical vibration of the first transducer and moves in the first direction with respect to the fixing member; a second transducer which is retained by the first mobile body including a second retaining part and generates an elliptical vibration in a driving part when a voltage of a predetermined frequency is applied; and a second mobile body to which the driving part of the second transducer is pressed, whose moving direction is regulated by a guiding part of the first mobile body to a second direction which is different from the first direction, and which is driven by the elliptical vibration of the second transducer and moves in the second direction with respect to the first mobile body. In the driving apparatus, at least one of the first mobile body and the second mobile body includes a first mobile body part which is formed in a desired size, and a second mobile body part which has a sliding part with which the driving part is in contact, and a guide-receiving part which is provided opposite the sliding part and whose moving direction is guided in engagement with the guiding part, the second mobile body part being of higher rigidity, formed in a smaller size than the first mobile body part, and fixed to the first mobile body part.

An image pickup apparatus which includes a microcomputer which controls an operation of an entirety of the image pickup apparatus, and in which a position of an image pickup element is changed and moved in a first direction and a second direction which are mutually orthogonal in a plane perpendicular to an imaging optical axis so that a blurring motion is compensated, according to still another aspect of the present invention includes: a first transducer which generates an elliptical vibration in a driving part when a voltage of a predetermined frequency is applied based on a command from the microcomputer; a fixing member which includes a first retaining part which retains the first transducer, and is fixed to a main body of the image pickup apparatus; a first mobile body to which the driving part of the first transducer is pressed, whose moving direction is regulated by a guiding part of the fixing member to a first direction, and which is driven by the elliptical vibration of the first transducer and moves in the first direction with respect to the fixing member; a second transducer which is retained by the first mobile body which has a second retaining part, and generates an elliptical vibration in a driving part when a voltage of a predetermined frequency is applied based on a command from the microcomputer; and a second mobile body to which the driving part of the second transducer is pressed, whose moving direction is regulated by a guiding part of the first mobile body to a second direction, and which is driven by the elliptical vibration of the second transducer, moves in the second direction with respect to the first mobile body, and retains the image pickup element in the imaging optical axis. In the image pickup apparatus, at least one of the first mobile body and the second mobile body includes a first mobile body part which is formed in a desired size, and a second mobile body part which has a sliding part with which the driving part is in contact, and a guide-receiving part which is provided opposite the sliding part and whose moving direction is guided in engagement with the guiding part, the second mobile body part being of higher rigidity, formed in a smaller size than the first mobile body part, and fixed to the first mobile body part.

An image pickup apparatus which includes a microcomputer which controls an operation of an entirety of the image pickup apparatus, and in which a position of an image pickup element is changed and moved in a first direction and a second direction which are mutually orthogonal in a plane perpendicular to an imaging optical axis so that a blurring motion is compensated, according to still another aspect of the present invention includes: a first transducer which generates an elliptical vibration in a driving part when a voltage of a predetermined frequency is applied based on a command from the microcomputer; a fixing member which is formed in a frame shape surrounding an opening around the imaging optical axis, includes a first retaining part which retains the first transducer, and is fixed to a main body of the image pickup apparatus; a first mobile body part which is formed in a frame shape surrounding an opening around the imaging optical axis and in a desired size; a second mobile body part which has a sliding part to which the driving part of the first transducer is pressed and contacted, and a guide-receiving part which is provided opposite the sliding part and whose moving direction is guided in engagement with a guiding part of the fixing member to a first direction, and which is driven by the elliptical vibration of the first transducer and moves in the first direction with respect to the fixing member, the second mobile body part being of higher rigidity, formed in a smaller size than the first mobile body part, and fixed to the first mobile body part; a second transducer which is retained by the first mobile body part which has a second retaining part, and generates an elliptical vibration in a driving part when a voltage of a predetermined frequency is applied based on a command from the microcomputer; a third mobile body part which retains the image pickup element in the imaging optical axis and is formed in a desired size to be arranged in the opening of the first mobile body part; and a fourth mobile body part which has a sliding part to which the driving part of the second transducer is pressed and contacted, and a guide-receiving part which is provided opposite the sliding part and whose moving direction is guided in engagement with a guiding part of the first mobile body part to a second direction, and which is driven by the elliptical vibration of the second transducer and moves in the second direction with respect to the first mobile body part, the fourth mobile body part being of higher rigidity, formed in a smaller size than the third mobile body part, and fixed to the third mobile body part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a driving apparatus and an image pickup apparatus according to the present invention will be explained below with reference to the accompanying drawings. The image pickup apparatus according to the embodiment is equipped with the driving apparatus used for correcting a blurring motion caused by a hand movement in an image pickup unit including an image pickup element which obtains image signals via a photoelectric conversion. Here, the image pickup apparatus will be explained as an application to a single-lens reflex electronic camera (digital camera) with interchangeable lenses, as one example. The present invention is not limited to the embodiments, and various modifications may be made without departing from the spirit or scope of the general inventive concept of the present invention.

Figure 1:
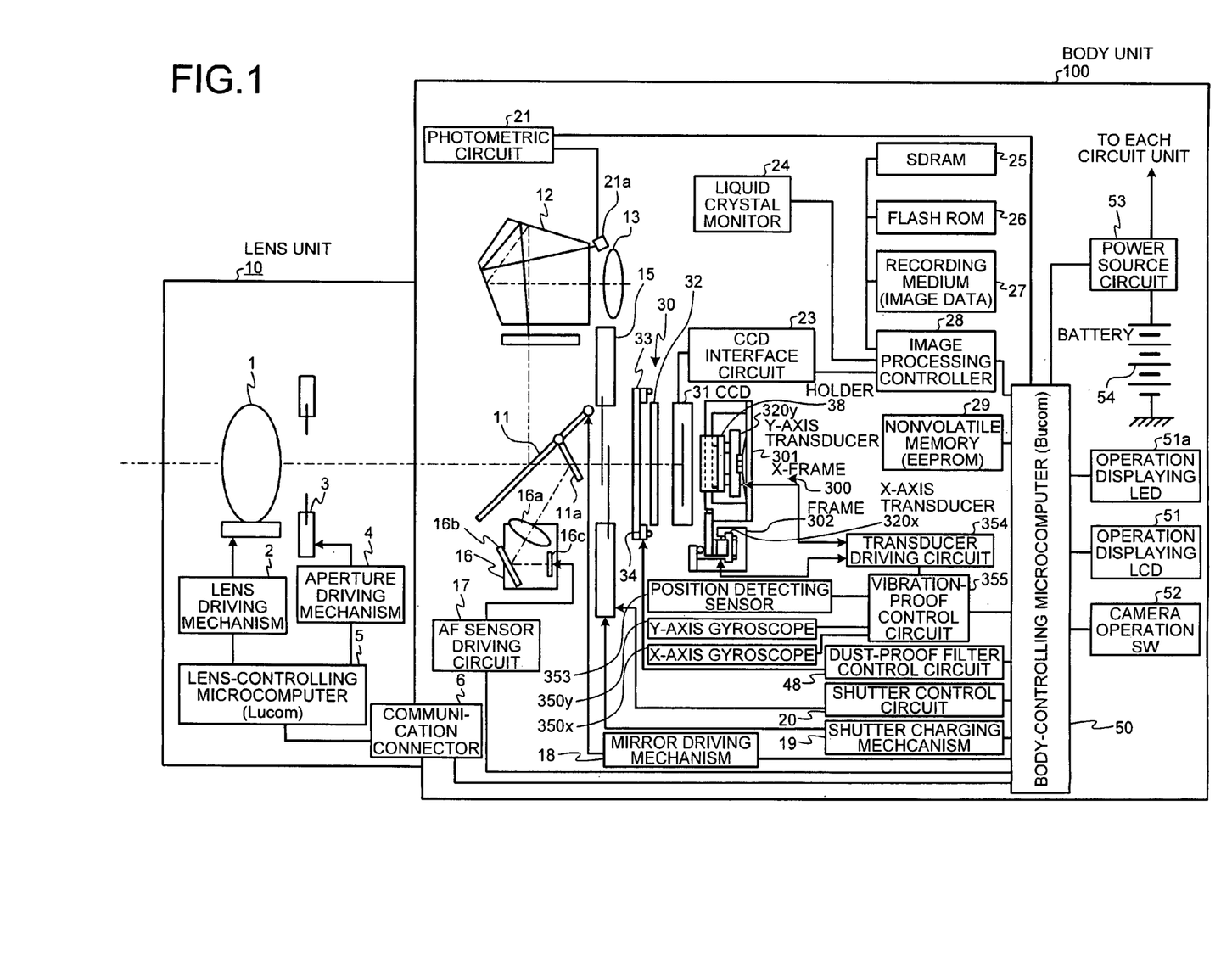
FIG. 1 is a schematic block diagram mainly showing an electric system structure of a camera according to an embodiment of the present invention.

First, an example of a system structure of the camera according to the embodiment will be explained with reference to FIG. 1. FIG. 1 is a schematic block diagram mainly showing an electric system structure of the camera according to the embodiment. The system of the camera according to the embodiment includes a body unit 100 as a main body of the camera, and a lens unit 10 as an interchangeable lens which is one of accessories of the camera.

The lens unit 10 is detachably attached via a lens mount which is, being not shown, provided at a front surface of the body unit 100. The lens unit 10 is controlled by a lens-controlling microcomputer (hereinafter referred to as "Lucom") 5 included in itself. The body unit 100 is controlled by a body-controlling microcomputer (hereinafter referred to as "Bucom") 50. The Lucom 5 and the Bucom 50 are electrically connected via a communication connector 6 to allow a communication therebetween in a state where the lens unit 10 is attached to the body unit 100. As a camera system, the Lucom 5 is configured to operate subserviently in cooperation with the Bucom 50.

The lens unit 10 includes an imaging lens 1 and an aperture 3. The imaging lens 1 is driven by a DC motor, not shown, provided in a lens driving mechanism 2. The aperture 3 is driven by a stepping motor, not shown, provided in an aperture driving mechanism 4. The Lucom 5 controls each motor based on a command from the Bucom 50.

In the body unit 100, the following constructional members are arranged as shown in the figure. For example, constructional members (a pentaprism 12, a quick-return mirror 11, an eyepiece 13, and a sub-mirror 11a) of a single-lens reflex system as an optical system; a shutter 15 of a focal plane system in an imaging optical axis; and an AF sensor unit 16 which receives a light beam reflected from the sub-mirror 11a and detects an amount of defocusing are provided. The AF sensor unit 16, which employs a phase-difference detection method, includes a single lens 16a, a reflection mirror 16b, and an AF sensor 16c using the CCD and the like.

In addition, an AF sensor driving circuit 17 which controls to drive the AF sensor unit 16, a mirror driving mechanism 18 which controls to drive the quick-return mirror 11, a shutter charging mechanism 19 which charges a spring which drives a first shutter curtain and a second shutter curtain of the shutter 15, a shutter driving circuit 20 which controls a motion of the first shutter curtain and the second shutter curtain, and a photometric circuit 21 which performs a photometric processing based on a photometric sensor 21a which detects a light beam from the pentaprism 12 are provided in the body unit 100.

An image pickup unit 30 for performing a photoelectric conversion of a subject image which has passed through the optical system described above is provided in the imaging optical axis. The image pickup unit 30 is integrally formed as a unit including a CCD 31 as an image pickup element, an optical low-pass filter (LPF) 32 provided at an anterior surface of the CCD 31, and a dust-proof filter 33. A piezoelectric element 34 is attached at the periphery of the dust-proof filter 33. The piezoelectric element 34 having two electrodes is configured to vibrate at a predetermined frequency by a dust-proof filter driving circuit 48 and to make the dust-proof filter 33 vibrate, so that a dust adhering to the filter surface can be removed. The image pickup unit 30 is provided with a vibration-proof unit for correcting a blurring motion caused by a hand movement, which will be explained later.

The camera system according to the embodiment, including a CCD interface circuit 23 connected to the CCD 31, a liquid crystal monitor 24, an SDRAM 25 which functions as a storage area, and an image processing controller 28 which performs an image processing using a Flash ROM 26 and the like, is configured to be able to provide an electronic image-pickup function and an electronic record-display function. Here, a recording medium 27, being an external recording medium such as a memory card of various types and an external hard disc drive, is interchangeably attached to the camera main body via a communication connector to allow a communication therebetween. Image data obtained by imaging is recorded in the recording medium 27. As another storage area, a nonvolatile memory 29, for example realized by an EEPROM, which stores predetermined control parameters necessary for controlling the camera, is provided so as to be accessed by the Bucom 50.

The Bucom 50 is provided with an operation displaying LCD 51 and an operation displaying LED 51a which inform a user of an operation state of the camera via a display output, and a camera operation SW 52. The camera operation SW 52 is a group of switches including operation buttons such as a release SW, a mode change SW, and a power SW necessary for operating the camera. The Bucom 50 is further provided with a battery 54 as a power source, a power source circuit 53 which supplies a voltage of the battery 54 after converting to a voltage necessary for each circuit unit constituting the camera system, and a voltage detecting circuit which detects a voltage change at the time when a current is supplied from an external power source via a jack.

Each component of the camera system configured as described above generally operates in a way described below. First, the image processing controller 28 controls the CCD interface circuit 23 according to a command of the Bucom 50 to take image data from the CCD 31. The image data is converted to a vide signal by the image processing controller 28, output, and displayed on the liquid crystal monitor 24. The user can check captured images from the images displayed on the liquid crystal monitor 24.

The SDRAM 25, being a memory for temporarily storing image data, is used as a work area when the image data is converted. The image data, after converted into JPEG data, is stored in the recording medium 27.

The mirror driving mechanism 18 drives the quick-return mirror 11 to an up position and a down position. When the quick-return mirror 11 is at the down position, the light beam from the imaging lens 1 is divided and guided to a side of the AF sensor unit 16 and to a side of the pentaprism 12. An output from the AF sensor in the AF sensor unit 16 is transmitted to the Bucom 50 via the AF sensor driving circuit 17, and a known distance-measuring processing is performed. On the other hand, a part of the light beam having passed through the pentaprism 12 is guided to the photometric sensor 21a in the photometric circuit 21, and a known photometric processing is performed based on the sensed light intensity.

Figure 2:
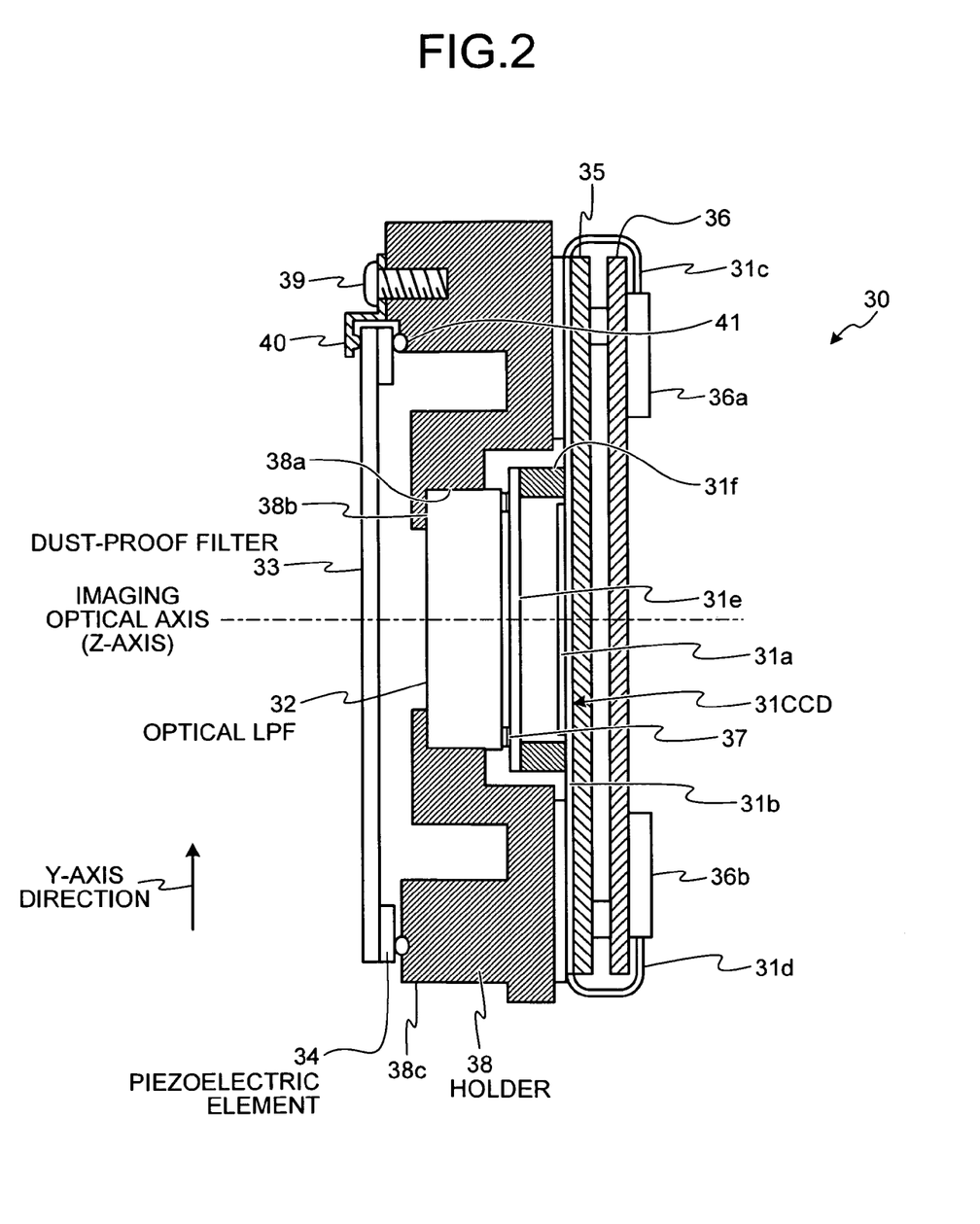
FIG. 2 is a side view of a longitudinal section showing a structural example of an image pickup unit.

Next, the image pickup unit 30 including the CCD 31 will be explained with reference to FIG. 2. FIG. 2 is a side view of a longitudinal section showing a structural example of the image pickup unit 30. The image pickup unit 30 includes the CCD 31 as an image pickup element that obtains an image signal corresponding to the light which has passed through the imaging optical system and been exposed to a photoelectric conversion surface of the CCD 31; the optical low-pass filter (LPF) 32 that is provided at a side of the photoelectric conversion surface of the CCD 31 and eliminates a high-frequency component from the light beam which has passed through the imaging optical system to be exposed to a subject body; the dust-proof filter 33 that is arranged to face the optical LPF 32 with a predetermined interval at the anterior surface side of the optical LPF 32; and the piezoelectric element 34 that is arranged at the periphery of the dust-proof filter 33 and feeds a predetermined vibration to the dust-proof filter 33.

Here, a chip 31a of the CCD 31 is directly mounted on a flexible substrate 31b arranged on a clamping plate 35, and connecting parts 31c and 31d extended from both ends of the flexible substrate 31b are connected to a side of a main circuit substrate 36 via connectors 36a and 36b which are provided on the main circuit substrate 36. A protection glass 31e of the CCD 31 is fixed on the flexible substrate 31b via a spacer 31f.

A filter receiving member 37 formed of an elastic member and the like is provided between the CCD 31 and the optical LPF 32. The filter receiving member 37 is arranged at a periphery position, which is away from the effective range of the photoelectric conversion surface, on the anterior surface side of the CCD 31, and is in direct contact with a proximity of the periphery on the posterior surface side of the optical LPF 32, so that a substantial airtightness is configured to be retained between the CCD 31 and the optical LPF 32. A holder 38 which covers the CCD 31 and the optical LPF 32 in the airtight manner is further provided. The holder 38 has an opening 38a of a rectangular shape substantially at a center part around the imaging optical axis, a step part 38b whose cross section has a substantial L-shape is formed in an inner periphery of the opening 38a at a side of the dust-proof filter 33, and the optical LPF 32 and the CCD 31 are arranged at the posterior side to the opening 38a. Here, the periphery part on the anterior surface side of the optical LPF 32 is arranged to be in contact with the step part 38b substantially in the airtight manner, so that the optical LPF 32 is restrictively positioned in the imaging optical axis direction by the step part 38b and is prevented from getting out of the inside of the holder 38 to the anterior surface side.

Meanwhile, a dust-proof-filter receiving part 38c which protrudes toward the anterior surface side more than the step part 38b is formed in the entire circumference at the periphery part on the anterior surface side of the holder 38, so as to retain the dust-proof filter 33 at the anterior side of the optical LPF 32 with a predetermined distance. The dust-proof filter 33 formed in a circular plate or a polygonal plate as a whole is supported by the dust-proof-filter receiving part 38c in a state of being pressed by a pressing member 40 which is formed of an elastic body such as a leaf spring and fixed to the dust-proof-filter receiving part 38c with a screw 39. Here, a seal 41 having a ring-like form is provided between the part of the piezoelectric element 34 which is arranged at a marginal part on the rear surface side of the dust-proof filter 33 and the dust-proof-filter receiving part 38c, so that the airtight state is secured. In this manner, the image pickup unit 30 is configured to have an airtight structure including the holder 38 which is formed in a desired size suitable for mounting the CCD 31.

Next, a function of correcting the blurring motion caused by a hand movement of the camera according to the embodiment will be explained. In the embodiment, the position of the CCD 31 as the image pickup element is configured to be changed and moved, to compensate the blurring motion, in an X-axis direction as a first direction and a Y-axis direction as a second direction which are mutually orthogonal in the XY plane perpendicular to the imaging optical axis whose direction is set to be a Z-axis direction. The vibration-proof unit including a driving apparatus for correcting the blurring motion caused by a hand movement is configured to use, as a driving source, a transducer which generates an elliptical vibration in a driving part when a voltage of a predetermined frequency is applied, and configured to have the holder 38 which mounts the CCD 31 in the image pickup unit 30 as a moving target.

Figure 3:
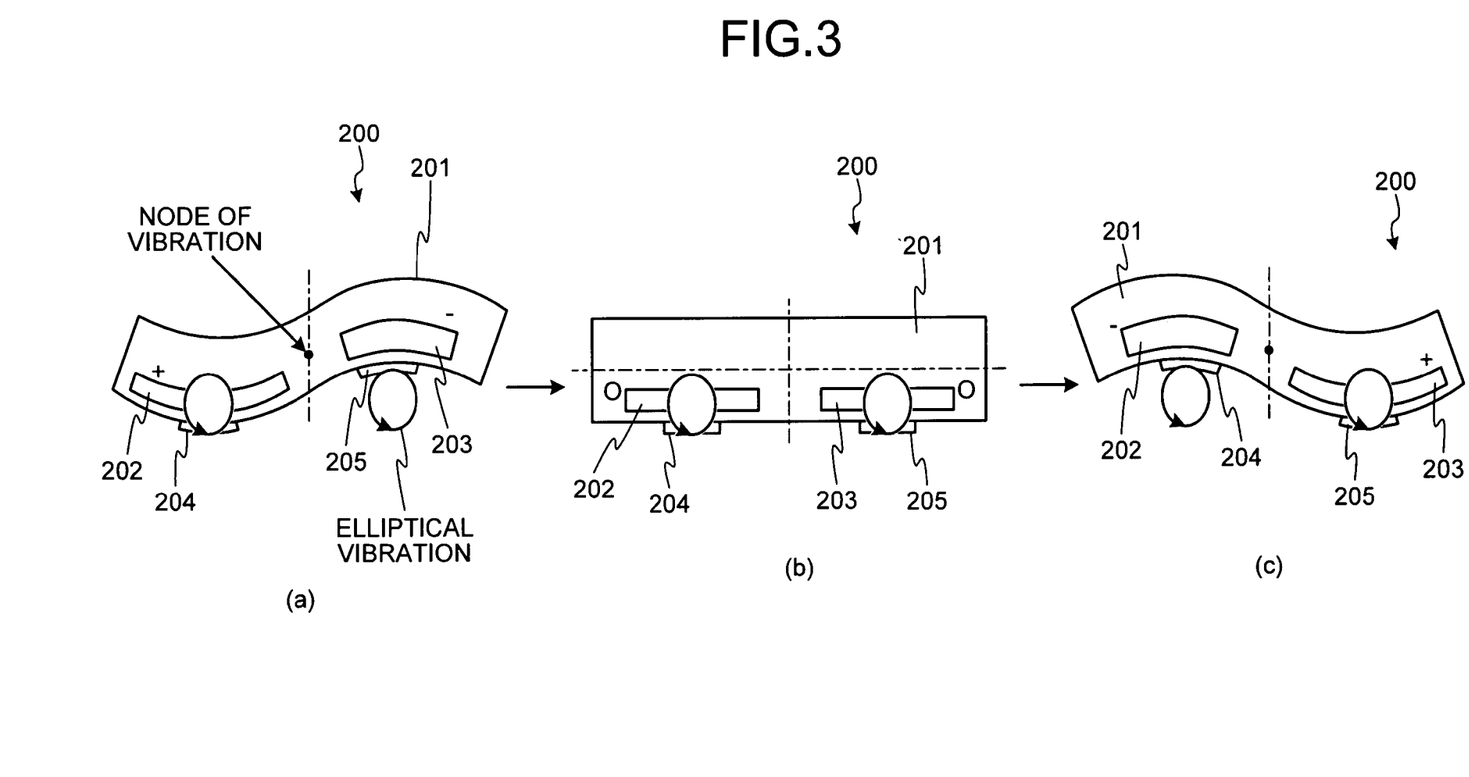
FIG. 3 is a view showing an operation principle of a transducer.

First, an operation principle of the transducer used as the driving source in the driving apparatus according to the embodiment will be explained. FIG. 3 is a view showing the operation principle of the transducer. A transducer 200 includes a piezoelectric body 201 which is formed to have a rectangular shape in a predetermined size; a pair of driving electrodes 202 and 203 which are formed to be located at one surface side of the piezoelectric body 201, polarized, and centrally symmetric; and drivers 204 and 205 which are provided as the driving part at positions, corresponding to the driving electrodes 202 and 203, on a surface of the piezoelectric body 201. When a positive voltage is applied to the driving electrode 202, the driving electrode 202 in the polarized structure deforms to stretch while a part on the rear surface side of the piezoelectric body 201 does not deform to stretch, and thereby an arc-shape deformation is caused as a whole, as shown in FIG. 3 (a). In contrast, when a negative voltage is applied to the driving electrode 202, the driving electrode 202 in the polarized structure deforms to shrink while the part on the rear surface side of the piezoelectric body 201 does not deform to shrink, and thereby an arc-shape deformation whose warp is reverse to that shown in FIG. 3 (a) is caused as a whole, as shown in FIG. 3 (c). The same applies to the side of the driving electrode 203.

To generate the elliptical vibration on the surfaces of the drivers 204 and 205, a sine wave voltage of a predetermined frequency is applied to one of the polarized driving electrodes, i.e. the driving electrode 202 in the piezoelectric body 201, and a sine wave voltage of a shifted phase and of the same frequency as that of the voltage applied to the driving electrode 202 is applied to the other one of the driving electrodes, i.e., the driving electrode 203. The frequency of the voltage to be applied is set to a predetermined numeric value which enables a center of the piezoelectric body 201 to be a node of the curvature vibration, the drivers 204 and 205 to be antinodes of the curvature vibration, and a node of a longitudinal vibration of the piezoelectric body 201 to be coincident with the node of the curvature vibration. As a result, according to changes between positive and negative in the applying voltage, the transducer 200 repeats the curvature vibrations shown in FIG. 3 (a) to (c) including a restored state shown in FIG. 3 (b), so that the elliptical vibration is generated on the surfaces of the drivers 204 and 205. Therefore, when a mobile body as a driving target is arranged so as to be pressed and contacted on the drivers 204 and 205 of the transducer 200, the mobile body moves according to the direction of the elliptical vibration generated on the surfaces of the drivers 204 and 205.

In this case, when a phase difference in the voltage of the predetermined frequency applied to the driving electrodes 202 and 203 is changed, the shape of the elliptical vibration generated on the surfaces of the drivers 204 and 205 can be changed, and thereby the moving velocity of the mobile body which moves by being driven by the transducer 200 can be changed. For example, when the phase difference in the voltage of the predetermined frequency is zero degree, the velocity is zero. An increase in the phase difference causes a gradual increase in the velocity, a phase difference of plus 90 degrees causes a maximum velocity, a greater phase difference than the plus 90 degrees reversely causes a gradual decrease in the velocity, and a phase difference of plus 180 degrees again causes zero velocity. When the phase difference is set to a negative value, the rotating direction of the elliptical vibration generated on the drivers 204 and 205 becomes reverse, and thereby the mobile body can be driven in the reverse direction. In this case again, a phase difference of minus 90 degrees causes the maximum velocity.

Figure 4:
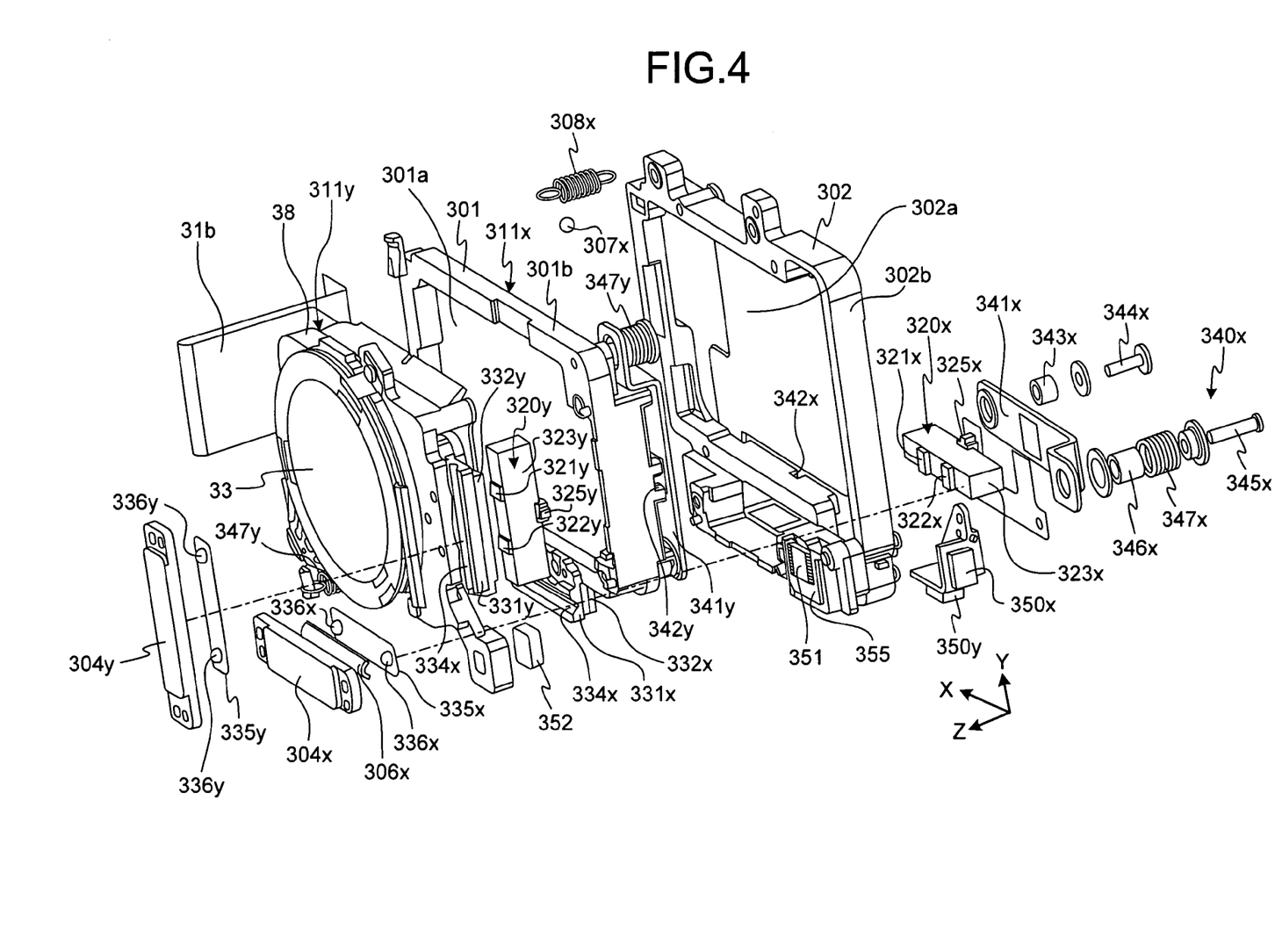
FIG. 4 is an exploded perspective view showing a structural example of a vibration-proof unit.
Figure 5:
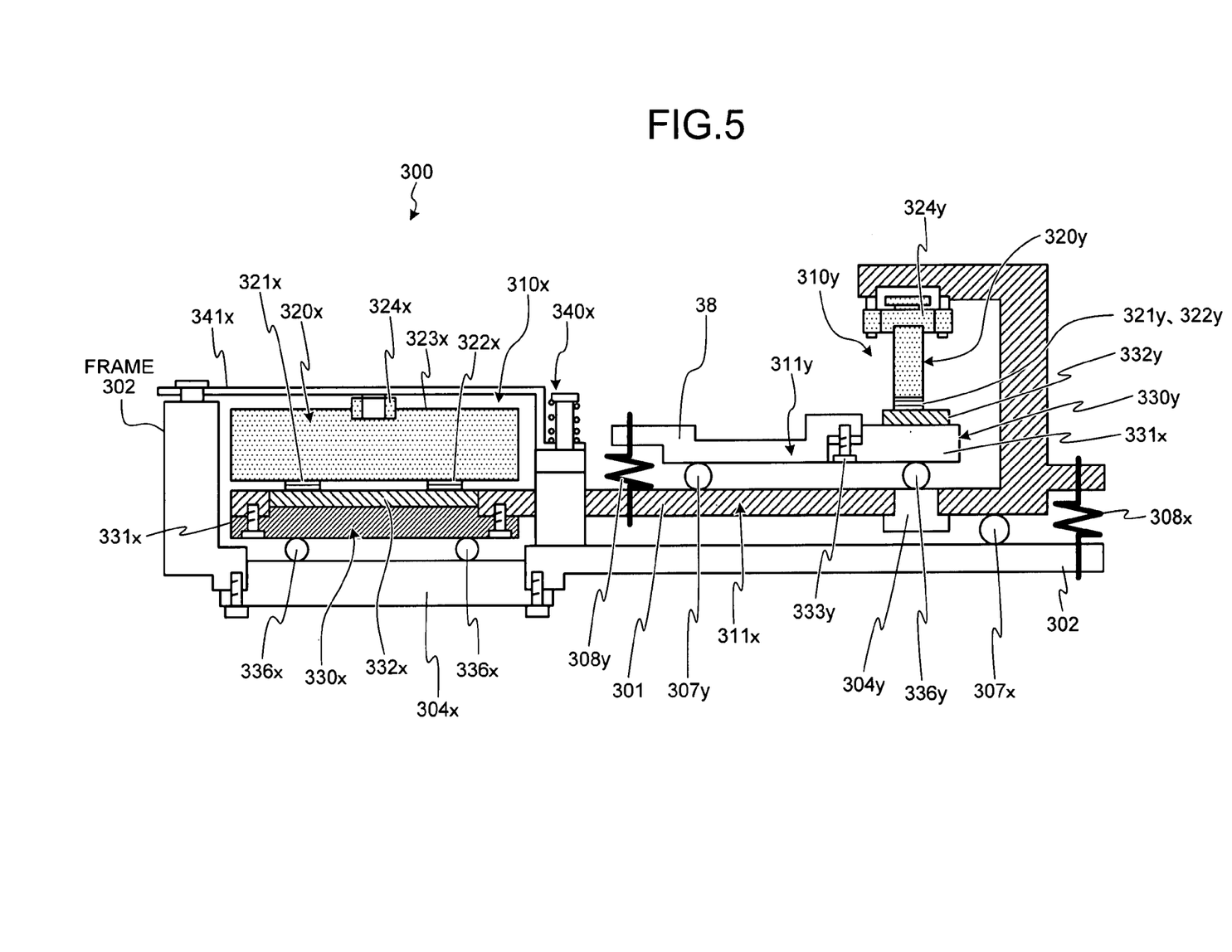
FIG. 5 is a schematic side view of the vibration-proof unit showing a simplified shape of each part shown in FIG. 4.
Figure 6:
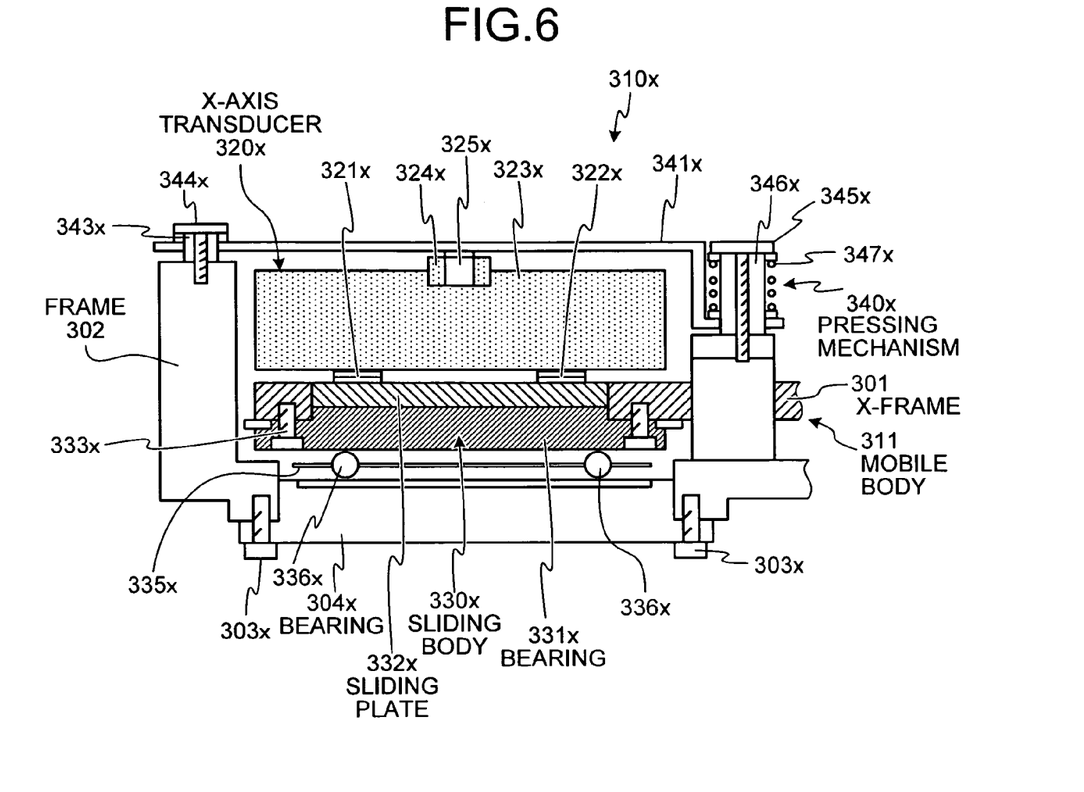
FIG. 6 is a schematic side view showing an extracted and magnified X-axis driving mechanism in FIG. 5.
Figure 7:
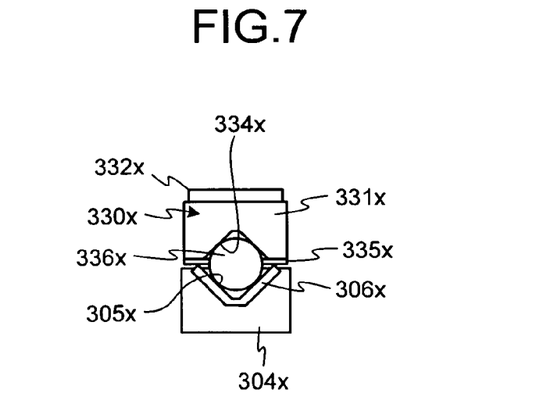
FIG. 7 is a cross sectional view showing a guide bearing structure.

Next, the vibration-proof unit using the transducer as a driving source according to the embodiment will be explained with reference to FIGS. 4 to 7. FIG. 4 is an exploded perspective view showing a structural example of the vibration-proof unit according to the embodiment, FIG. 5 is a schematic side view of the vibration-proof unit showing a simplified shape of each part shown in FIG. 4, FIG. 6 is a schematic side view showing an extracted and magnified X-axis driving mechanism in FIG. 5, and FIG. 7 is a cross sectional view showing a guide bearing structure thereof.

In a vibration-proof unit 300 according to the embodiment, the holder 38 mounting the CCD 31 together with the optical LPF 32, the dust-proof filter 33, and the like is configured to be an ultimate moving target to be moved in the X-axis direction and the Y-axis direction. The vibration-proof unit 300 includes an X-frame (a first mobile body part) 301 which is formed in a frame shape with a frame part 301b surrounding an opening 301a around the imaging optical axis and in a desired size so that the holder 38 is mounted therein to be movable in the Y-axis direction; and a frame (fixing member) 302 which is formed in a frame shape with a frame part 302b surrounding an opening 302a around the imaging optical axis and in a desired size so that the X-frame 301 is mounted therein to be movable in the X-axis direction, and which is fixed to the camera main body not shown.

The vibration-proof unit 300 further includes an X-axis driving mechanism 310x which makes the position of the X-frame 301 change and move in the X-axis direction with respect to the frame 302; and a Y-axis driving mechanism 310y which makes the position of the holder 38 change and move in the Y-axis direction with respect to the X-frame 301. When the position of the holder 38 is changed and moved in the X-axis direction with respect to the X-frame 301 and the frame 302, and is changed and moved in the Y-axis direction with respect to the X-frame 301, the position of the CCD 31 mounted to the holder 38 is changed and moved in the X-axis direction and the Y-axis direction within the XY plane so that the blurring motion is compensated.

Here, the structure of the X-axis driving mechanism 310x will be explained. The X-axis driving mechanism 310x includes an X-axis transducer (a first transducer) 320x; a sliding body (a second mobile body part) 330x which is integrally fixed to the X-frame 301 and constitutes a mobile body (a first mobile body) 311x as the driving target together with the X-frame 301; and a pressing mechanism (a biasing unit) 340x which biases the X-axis transducer 320x to the side of the sliding body 330x.

Based on the operation principle of the transducer 200 explained in FIG. 3, the X-axis transducer 320x includes, on one surface of a piezoelectric body 323x of a rectangular shape, drivers (driving parts) 321x and 322x which generate the elliptical vibration when a voltage of a predetermined frequency is applied thereto. The X-axis transducer 320x has a transducer holder 324x at a center position on a side opposite the side where the drivers 321x and 322x are provided of the piezoelectric body 323x. When a protrusion 325x formed at the transducer holder 324x fits in a groove 342x (a retaining part) of the frame 302, the X-axis transducer 320x is positioned and retained so that the movement of the X-axis transducer 320x in the X-axis direction is regulated. With such a structure, a driving force of the elliptical vibration generated in the drivers 321x and 322x works in the X-axis direction.

The sliding body 330x is formed by fixing a sliding plate (sliding part) 332x on a bearing (a guide-receiving part) 331x. The bearing 331x is integrally fixed, for example by using a screw 333x, to a part of the X-frame 301 at positions where the drivers 321x and 322x of the X-axis transducer 320x are pressed to be in contact with the sliding plate 332x. The fixation of the sliding body 330x to the X-frame 301 is not limited to the screwing method, may be an adhesive bonding and the like, and any other fixation methods may be employed. Here, the sliding body 330x is formed in a smaller size (a size corresponding to the X-axis transducer 320x) than the X-frame 301 formed in a desired size as apparently seen in FIG. 4. While the X-frame 301 is formed by using a resin material, aluminum alloy, magnesium alloy having a high performance in vibration absorption, and the like, the sliding plate 332x is formed by using ceramics and the like having an abrasion resistance so as to have greater rigidity than the X-frame 301, and the bearing 331x is formed to have high rigidity by hardening materials such as ferritic stainless-steel suitable for the hardening.

The frame 302 includes a bearing (a guiding part) 304x which is arranged at an attachment part having an opening shape formed in the frame 302, and fixed with a screw 303x in a manner of facing the bearing 331x of the sliding body 330x. A V-shaped groove plate 306x for wear prevention is fixed to the bearing 304x to form a V-shaped groove 305x along the X-axis direction as shown in FIG. 7. A V-shaped groove 334x is formed in the bearing 331x to face the V-shaped groove 305x (V-shaped groove plate 306x) of the bearing 304x as shown in FIG. 7. Here, by putting two balls 336x (a rolling body) whose positioning is made by a retainer 335x between the V-shaped grooves 305x and 334x, the bearings 304x and 331x are configured to have two balls 336x arranged in line along the X-axis direction. The two balls 336x are positioned respectively in the vicinity of positions right under the drivers 321x and 322x, as shown in FIG. 6 and the like, and the movement of the balls 336x in the X-axis direction is regulated by the retainer 335x. It should be noted that the rolling body is not limited to such balls and may be a roller.

The pressing mechanism 340x includes a pressing plate 341x whose one end is fixed to the frame 302 via a screw 344x through a spacer 343x to retain the X-axis transducer 320x; and a pressing spring 347x which is arranged through a spacer 346x around a screw 345x fixing the other end of the pressing plate 341x to the frame 302, and biases the pressing plate 341x so that the drivers 321x and 322x of the X-axis transducer 320x are pressed to be in contact with the sliding plate 332x. The pressing force of the pressing mechanism 340x is set to be very large enough to be as much as 15 N (newton).

Though the bearing 331x can rotate around the axis which penetrates the center of the balls 336x and is parallel to the V-shaped groove 334x, the bearing 331x is integrated to the X-frame 301. A ball 307x (a rotating body) is provided between the frame 302 and the X-frame 301 at a position away from the bearing 331x in a direction different from the X-axis direction (a position almost diagonal and farthermost from the bearing 331x on the frame part 302b). The ball 307x is retained in a state of being between the frame 302 and the X-frame 301 by a biasing force of a spring 308x which is latched therebetween in the vicinity of the ball 307x, and allows positioning the frame 302 and the X-frame 301 with a distance in the imaging optical axis (Z-axis) maintained therebetween. Here, it is only necessary to keep the ball 307x in between, and therefore the biasing force of the spring 308x is set to be much smaller than that of the pressing spring 347x. In this structure, the mobile body 311x constituted by the X-frame 301 and the sliding body 330x is configured to be movable with respect to the frame 302 based on the three-point supporting with the two balls 336x and the one ball 307x. Besides, the distance between the ball 307x and the balls 336x can be kept away by arranging the ball 307x at an opposite side across the imaging optical axis and the opening 301a from the balls 336x, and thereby a stable three-point supporting structure can be secured. According to the embodiment as described, it is possible to guide the moving direction of the mobile body 311x and also to regulate an inclination with the three balls (rotating bodies), and thereby a stable driving can be obtained.

Meanwhile, the basic structure of the Y-axis driving mechanism 310y is the same as that of the X-axis driving mechanism 310x. Therefore, a common part or a corresponding part is shown by being assigned with the same symbol having a suffix "y", and the explanation of such parts will not be repeated. In the Y-axis driving mechanism 310y, the X-frame 301 instead of the frame 302 is the fixing member, and the holder 38 instead of the X-frame 301 is the first mobile body part (or a third mobile body part) as the moving target. The Y-axis driving mechanism 310y includes a sliding body (the second mobile body part or a fourth mobile body part) 330y which is integrally fixed to the holder 38 and constitutes a mobile body (a second mobile body) 311y as the driving target together with the holder 38.

In the vibration-proof unit 300 according to the embodiment, an X-axis gyroscope 350x which detects a blurring motion about the X-axis (a blurring motion in the pitch direction) of the body unit 100 and a Y-axis gyroscope 350y which detects a blurring motion about the Y-axis (a blurring motion in the yaw direction) of the body unit 100 are provided to the frame 302. The vibration-proof unit 300 includes a position detecting sensor 353 which is constituted by a Hall element 351 provided to the frame 302 and a magnet 352 which is provided at a part of the holder 38 to face the Hall element 351. The vibration-proof unit 300 further includes a vibration-proof control circuit 355 which controls a transducer driving circuit 354 working for the X-axis transducer 320x and the Y-axis transducer 320y based on signals from the X-axis gyroscope 350x, the Y-axis gyroscope 350y, and the position detecting sensor 353. The vibration-proof control circuit 355 executes a controlling operation according to a command from the Bucom 50.

Next, an operation of the X-axis driving mechanism 310x will be explained. When a voltage of a predetermined frequency is applied to the X-axis transducer 320x to generate the elliptical vibration in the drivers 321x and 322x, the drivers 321x and 322x of the X-axis transducer 320x are pressed to be in contact with the sliding plate 332x due to the strong biasing force of the pressing mechanism 340x, and thereby the sliding body 330x is driven to the rotating direction of the elliptical vibration generated by the drivers 321x and 322x.

Figure 8:
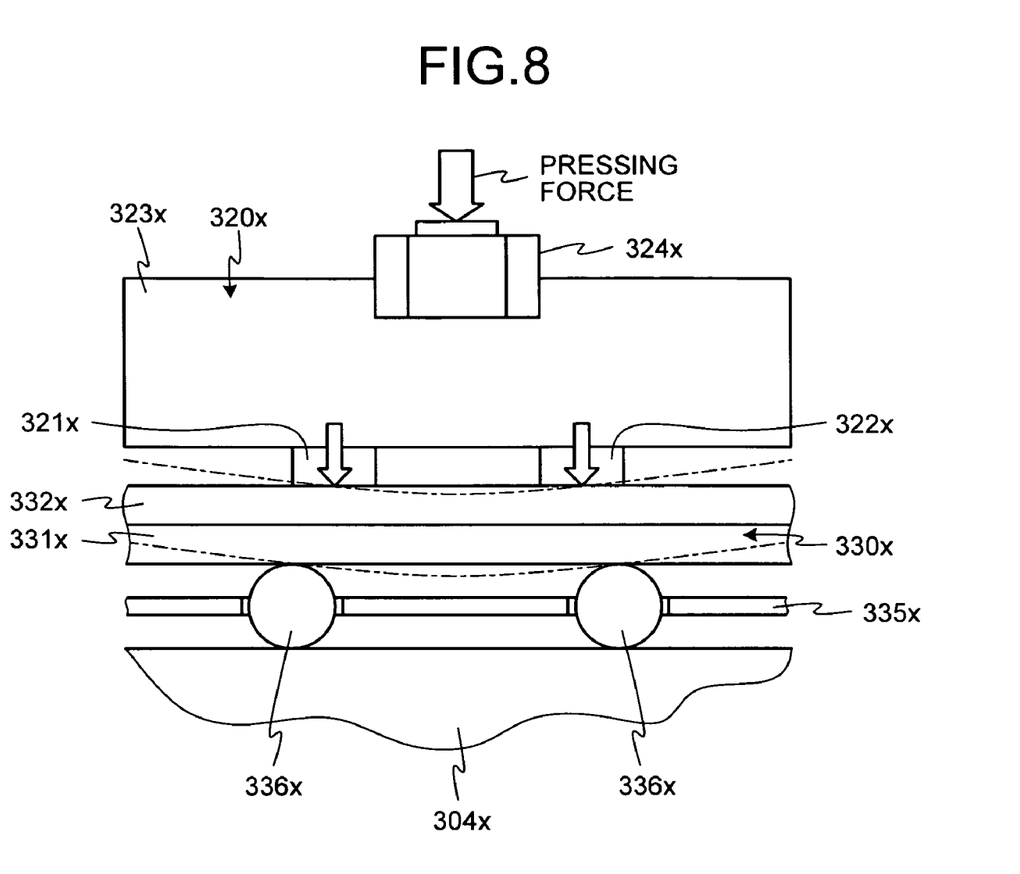
FIG. 8 is an explanatory diagram showing a state where a flexure is caused by a pressing force imposed on a transducer.

On this occasion, if the rigidity of the sliding plate 332x and the bearing 331x constituting the sliding body 330x is poor, the sliding plate 332x and the bearing 331x are flexed due to the imposed pressing force as shown by a virtual line in FIG. 8 since the pressing force applied to the X-axis transducer 320x is strong, the drivers 321x and 322x and the sliding plate 332x come to have a partial contact with each other, and an unstable operation or an operation failure occurs. In FIG. 8, the flexure is caused since the balls 336x are not located right under the drivers 321x and 322x. However, even when the balls 336x are provided right under the drivers 321x and 322x, the positions of the drivers 321x and 322x and the balls 336x would change by operation, and the occurrence of the flexure cannot be prevented.

In this respect, since the sliding plate 332x and the bearing 331x constituting the sliding body 330x has high rigidity in the embodiment, the state where the drivers 321x and 322x and the sliding plate 332x are pressed to be in contact with each other becomes stable, the driving force generated by the elliptical vibration can be surely transmitted to the sliding plate 332x, and the driving in the rotating direction of the elliptical vibration can be achieved with high efficiency. On this occasion, the sliding body 330x having the sliding plate 332x is not in surface contact with the frame 302, but in contact via the balls 336x at the bearing 331x and the bearing 304x in a rolling method. Therefore, the sliding body 330x can surely move under a condition of a little friction with the frame 302 even when the pressing force is strong. Since the bearings 331x and 304x form an in-line ball bearing structure along the X-axis direction, the sliding body 330x moves only in the X-axis direction when driven by the X-axis transducer 320x. When the sliding body 330x moves in this manner, the X-frame 301 to which the sliding body 330x is fixed also moves in the X-axis direction integrally with the sliding body 330x. In other words, the moving direction of the X-frame 301 is also guided due to the engagement between the bearings 331x and 304x of the in-line ball bearing structure along the X-axis direction.

In such operations, the bearing 331x stably moves on the frame 302 in the X-axis direction without causing a swing due to the rotation around the axis parallel to the V-shaped groove 334x though the bearing 331x can rotate around the axis which penetrates the center of the balls 336x and is parallel to the V-shaped groove 334x. This is because the bearing 331x is integrated to the X-frame 301, one ball 307x is provided between the frame 302 and the X-frame 301 at a position away from the bearing 331x in a direction different from the X-axis direction, and the mobile body 311x constituted by the X-frame 301 and the sliding body 330x is supported at three away positions with the two balls 336x and the one ball 307x with respect to the frame 302. As a result, a guide supporting mechanism as a part where a strong pressing force is given to the X-axis transducer 320x can be realized by the in-line ball bearing structure formed by the bearings 331x and 304x along the X-axis direction, enabling a downsizing and a simplification in the structure.

The Y-axis driving mechanism 310y operates in the same manner as the X-axis driving mechanism 310x.

Next, an operation of correcting the blurring motion caused by a hand movement will be explained. When a blurring-motion correcting SW, which is not shown, in the camera operation SW 52 is turned on and then a main SW, which is also not shown, is turned on, a signal to execute an initializing operation of the transducer driving circuit 354 is transmitted from the Bucom 50 to the vibration-proof control circuit 355, a voltage of a predetermined frequency is applied from the transducer driving circuit 354 to the X-axis transducer 320x and the Y-axis transducer 320y, and the X-frame 301 and the holder 38 are driven in the X-axis direction and the Y-axis direction so that the center of the CCD 31 falls on the imaging optical axis.

Then, a signal of the blurring motion of the body unit 100 detected by the X-axis gyroscope 350x and the Y-axis gyroscope 350y is taken in the vibration-proof control circuit 355. Here, in the X-axis gyroscope 350x and the Y-axis gyroscope 350y, a signal output from an angular velocity sensor which detects a blurring motion about one of the X-axis and Y-axis directions is amplified in a processing circuit, converted from an analogue to a digital, and then input to the vibration-proof control circuit 355.

The vibration-proof control circuit 355 calculates the correcting amount of the blurring motion based on the signal output from the X-axis gyroscope 350x and the Y-axis gyroscope 350y, and outputs a signal corresponding to the calculated correcting amount of the blurring motion to the transducer driving circuit 354. The X-frame 301 and the holder 38 mounting the CCD 31 are driven by the X-axis transducer 320x and the Y-axis transducer 320y which are operated based on an electric signal generated in the transducer driving circuit 354. A driving position of the CCD 31 (the holder 38) is detected by the position detecting sensor 353, and sent to the vibration-proof control circuit 355 to perform a feedback control.

In other words, the vibration-proof control circuit 355 calculates a reference value based on the signals input from the X-axis gyroscope 350x and the Y-axis gyroscope 350y (hereinafter the signal may be referred to as "blur signal" or "angular-velocity blur signal"). The calculation of the reference value is performed after the main power source of the camera is turned on until an exposure for capturing a still image is performed. For this calculation, there are a method of calculating a moving average value of the blur signals for relatively long time period, a method of calculating DC components by a low-pass filter whose cutoff frequency is relatively low, and the like, and it is only necessary to employ any of them. By differentiating the reference value computed in this calculation from the blur signal, a signal in which a low frequency component of the blur signal is eliminated can be obtained. Based on this signal and the signal output from the position detecting sensor 353, the transducer driving circuit 354 is controlled to move the position of the CCD 31 (holder 38) so that the blurring motion is compensated.

Here, the driving apparatus according to the embodiment is controlled by the Bucom 50. An example of controlling an imaging operation by the Bucom 50 will be explained with reference to FIGS. 9 and 10. The single-lens reflex digital camera according to the embodiment is configured to be able to select a mode of observing the subject body through a finder (an optical finder mode) and a mode of observing the subject body through the liquid crystal monitor 24 arranged on a rear surface of the camera (a live view mode).

Figure 9:
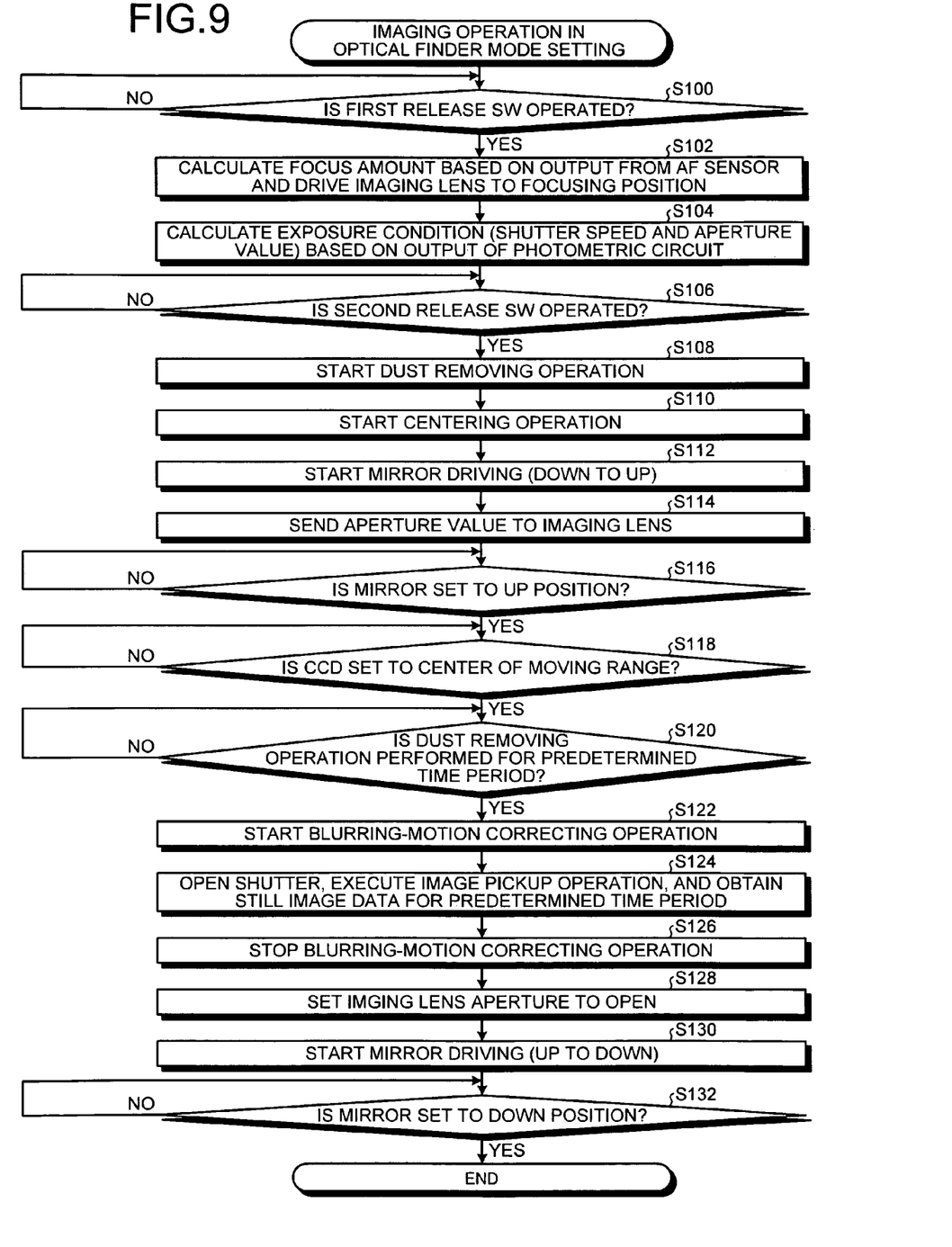
FIG. 9 is a flowchart of an example of controlling an imaging operation in a setting of an optical finder mode.

The example of controlling the imaging operation executed by the Bucom 50 in the optical finder mode will be explained with reference to FIG. 9. FIG. 9 is a flowchart of the example of controlling the imaging operation in the setting of the optical finder mode. The release SW as one of the camera operation SW is a switch of a two-stage structure. When the release SW is pressed halfway, a first release SW becomes on state, and when the release SW is pressed fully, a second release SW is turned on.

First, whether the first release SW is operated or not is detected (step S100). When the operation of the first release SW is detected ("Yes" at step S100), it moves to step S102. At step S102, the AF sensor driving circuit 17 is controlled to execute an integral operation of the AF sensor 16c and calculate the amount of defocusing based on data output from the AF sensor 16c. This focus detecting method is a known phase-difference method. The amount of defocusing is sent to the Lucom 5 used for the imaging lens 1. The Lucom 5 drives the imaging lens 1 to a focusing position based on the received defocusing amount. After step S102, an exposure condition is set based on the output of photometric circuit 21 (step S104). Namely, a setting value for the aperture, a shutter speed, and the like are determined.

Next, whether the second release SW is operated or not is detected (step S106). When the operation of the second release SW is detected ("Yes" at step S106), it moves to step S108. Since the dust-proof filter 33 has to be vibrated to remove the dust adhering to the dust-proof filter 33, the dust-proof filter driving circuit 48 is controlled to send a driving signal to the piezoelectric element 34 which vibrates the dust-proof filter 33 and to start the dust removing operation (step S108).

Here, to remove the dust adhering to the dust-proof filter 33, the dust-proof filter 33 has to be vibrated for a predetermined time period. Before the imaging operation, some preparation operations (an operation of evacuating the quick-return mirror 11 out of the optical path, an operation of setting the aperture of the imaging lens 1 to a predetermined value, an operation of centering the mechanism of correcting the blurring motion, and the like) have to be executed. A sequential execution of these preparation operations increases a release time lag. Therefore, the preparation operations are executed in parallel with the dust-proofing operation in the embodiment. First of all, for the centering operation of moving the CCD 31 as the image pickup element to the center part of its moving range, the transducer driving circuit 354 is controlled to start supplying a driving signal to an actuator which moves the CCD 31 before performing the blurring-motion correcting operation (step S110). Then, a driving for moving the quick-return mirror 11 from the down position to the up position is started (step S112). Further, the setting value of the aperture determined at step S104 is sent to the Lucom 5 (step S114). The Lucom 5 receives this information and drives the aperture 3 by the aperture driving mechanism 4.

Next at step S116, the operation stands by until the quick-return mirror 11 is set to the up position. When the quick-return mirror 11 is set to the up position ("Yes" at step S116), it moves to step S118. At step S118, whether the CCD 31 is set to the center part of the moving range or not is detected. When the CCD 31 is set to the center part ("Yes" at step S118), the centering operation is stopped to move to step S120. At step S120, the operation stands by until a predetermined time period lapses after the dust-proofing operation is started. When the predetermined time period lapses ("Yes" at step S120), the vibrating operation of the dust-proof filter 33 is stopped to move to step S122.

The preparation operations for the imaging are executed during the execution of the dust-proofing operation through the operations at steps S108 to S120, and therefore the time period after the second release SW is turned on until the imaging is started can be shortened. At step S122, the operation for correcting the blurring motion is started for preventing image degradation due to the blurring motion caused during the imaging, and then it moves to step S124. At step S124, the shutter 15 is controlled to expose the CCD 31 based on the shutter speed determined at step S104. A command to obtain a still image is given to the image processing controller 28. The image processing controller 28 performs a predetermined image processing on the image data obtained from the CCD 31 to store in the recording medium 27.

Then, the blurring-motion correcting operation is stopped (step S126) and a command to drive the aperture 3 to an open position is given to Lucom 5 (step S128). A driving for setting the quick-return mirror 11 to be in the optical path is started (step S130). When the setting of the quick-return mirror 11 to the down position is detected ("Yes" at step S132), the driving operation is stopped.

To repeat further imaging operation, it is only necessary that the operations shown at steps S100 to S132 are repeated.

Figure 10:
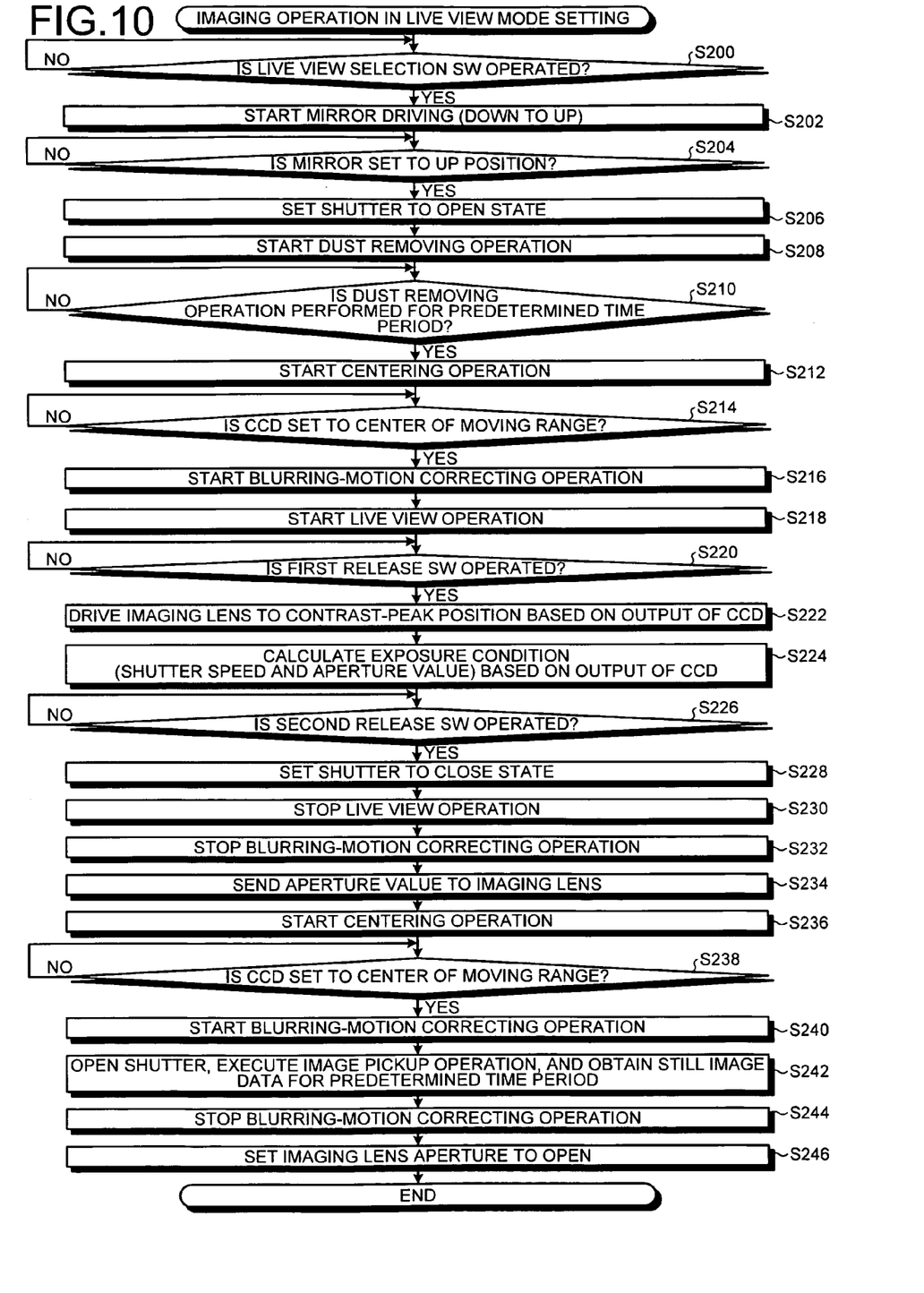
FIG. 10 is a flowchart of an example of controlling an imaging operation in a setting of a live view mode.

Next, an example of controlling an imaging operation executed by the Bucom 50 in the live view mode will be explained with reference to FIG. 10. FIG. 10 is a flowchart of an example of controlling the imaging operation in the setting of the live view mode.

First, whether a live view selection SW as one of the camera operation SW 52 is operated or not is detected (step S200). When the operation of the live view selection SW is detected ("Yes" at step S200), it moves to step S202. For executing the live view operation, the quick-return mirror 11 located in the optical path (at the down position) has to be driven out of the optical path (at the up position). Hence at step S202, a driving of the quick-return mirror 11 is started. Next, whether the quick-return mirror 11 is driven to the up position or not is detected (step S204). When the quick-return mirror 11 is driven to the up position ("Yes" at step S204), the operation is stopped and the shutter 15 is set to an open state so that the subject body is imaged in the CCD 31 (step S206).

Then it moves to step S208. The dust-proof filter 33 has to be vibrated for removing the dust adhering to the dust-proof filter 33. For this, the dust-proof filter driving circuit 48 is controlled to send a driving signal to the piezoelectric element 34 which vibrates the dust-proof filter 33, and to start the dust-proofing operation (step S208). After that, at step S210, the operation stands by until a predetermined time period lapses after the dust-proofing operation is started. When the predetermined time period lapses ("Yes" at step S210), the vibrating operation of the dust-proof filter 33 is stopped to move to step S212. At step S212, the centering operation is started. Whether the CCD 31 is set to the center part of the moving range or not is detected (step S214). When the CCD 31 is set to the center part ("Yes" at step S214), the centering operation is stopped to move to step S216.

Here, if the image to be displayed on the liquid crystal monitor 24 blurs during the live viewing, the observation becomes difficult. Therefore, the blurring-motion correcting operation is required during the live viewing. Accordingly, the centering operation is required before starting the live viewing. The driving operation of the quick-return mirror 11 and the centering operation of the blurring-motion correcting mechanism are the same as the preparation operations for the imaging. Though the dust-proofing operation and the preparation operations for the imaging are executed concurrently in FIG. 9, it is not a significant problem that the time period required for the operation for changing from the optical finder mode to the live view mode is longer than the release time lag. Therefore, the dust-proofing operation and the preparation operations for the imaging are executed sequentially in the live view mode as shown in FIG. 10. Without performing the operations concurrently, the load imposed on the power source can be reduced since the actuator to be driven at the same time is eliminated.

Next at step S218, a command to start the live view operation is given to the image processing controller 28. The image processing controller 28 obtains image data from the CCD 31 at a predetermined frame rate and displays the image on the liquid crystal monitor 24. Then at step S220, whether the first release SW is operated or not is detected. When the "on" state of the first release SW is detected, it moves to step S222. At step S222, a focus adjusting operation of a known contrast method is executed. The imaging lens 1 is driven and the contrast of the image data obtained from the CCD 31 is detected. The position of the imaging lens 1 is set to a position where the contrast becomes the maximum. At step S224, the exposure condition is set based on the output of the CCD 31. In other words, the setting value for the aperture, the shutter speed, and the like are determined.

At step 226, whether the second release SW is operated or not is detected. When the operation of the second release SW is detected, it moves to step S228. At step S228, the live view operation is stopped before the imaging operation and the shutter 15 is set to a close state. A command to stop the live view operation is given to the image processing controller 28 (step S230), and the blurring-motion correcting operation during the live viewing is stopped (step S232). At step S234, the setting value for the aperture determined at step S224 is sent to the Lucom 5. The Lucom 5 receives this information and drives the aperture 3 by the aperture driving mechanism 4. Since the centering operation is required before the blurring-motion correcting operation which is performed during the imaging, the centering operation is started at step S236. At step S238, whether the CCD 31 is set to the center part of the moving range or not is detected. When the CCD 31 is set to the center part, the centering operation is stopped to move to step S240.

At step S240, the blurring-motion correcting operation is started to prevent image degradation due to the blurring motion caused during the imaging. Then at step S242, the shutter 15 is controlled to expose the CCD 31 based on the shutter speed determined at step S224. A command to obtain a still image is given to the image processing controller 28. The image processing controller 28 performs a predetermined image processing on the image data obtained from the CCD 31 to store in the recording medium 27. After that, the blurring-motion correcting operation is stopped at step S244, and a command to drive the aperture 3 to the open position is given to the Lucom 5 at step S246.

To further continue the live view operation and the imaging operation, it is only necessary that the operations of steps S206 to S246 are repeated.

According to the embodiment, the transducers 320$x$ and 320$y$ that generate the elliptical vibration from which a large driving force can be easily obtained with high efficiency are used as a driving source. In the mobile body 311$x$ and the mobile body 311$y$, the first mobile body part like the X-frame 301 and the holder 38 which are formed in a desired size as a primary moving target, and the second mobile body part like the sliding body 330$x$ and the sliding body 330$y$ which are smaller than the first mobile body part are fixed and integrated in a separable structure. By providing the sliding plates 332$x$ and 332$y$, and the bearings 331$x$ and 331$y$ to the smaller second mobile body part, a function of transmitting the driving force from the transducers 320$x$ and 320$y$, and a function of guiding the moving direction are consolidated. The larger first mobile body part is configured to simply follow the second mobile body part and move together, and only the smaller second mobile body part is formed to have high rigidity, so that high efficiency in transmitting the driving force can be obtained. Further, the first mobile body part can be simply formed in a desired size with a light material without requiring as high rigidity as the second mobile body part, and does not need a particular guiding mechanism which regulates the moving direction of the first mobile body part, so that a large driving force and high efficiency in a smaller size and with a lighter weight can be realized as a whole.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A driving apparatus, comprising:
   a transducer which generates an elliptical vibration in a driving part when a voltage of a predetermined frequency is applied;
   a fixing member including a retaining part which retains the transducer; and
   a mobile body which is driven by the elliptical vibration of the transducer and moves with respect to the fixing member, wherein
   the mobile body includes
      a first mobile body part which is formed in a desired size and is formed of one of a resin material, aluminum, and magnesium, and
      a second mobile body part which has a sliding part to which the driving part is pressed and contacted, and a guide-receiving part which is provided opposite the sliding part and whose moving direction is guided in engagement with a guiding part of the fixing member, the second mobile body part being of higher rigidity, formed in a smaller size than the first mobile body part, and fixed to the first mobile body part.

2. The driving apparatus according to claim 1, wherein a moving direction of the first mobile body part which moves with the second mobile body part is guided by an engagement between the guiding part of the fixing member and the guide-receiving part of the second mobile body part.

3. The driving apparatus according to claim 1, further comprising a biasing unit which biases the transducer so that the driving part is pressed to the sliding part from a side across the second mobile body part and the transducer from the guiding part.

4. The driving apparatus according to claim 1, further comprising:
   a rolling body arranged between the guiding part and the guide-receiving part in line along the moving direction, and
   another rolling body for positioning which is provided at a position away from the guiding member in a direction different from the moving direction of the guiding member in a state of being between the first mobile body part and the fixing member with a biasing force.

5. A driving apparatus, comprising:
   a first transducer which generates an elliptical vibration in a driving part when a voltage of a predetermined frequency is applied;
   a fixing member including a first retaining part which retains the first transducer;
   a first mobile body to which the driving part of the first transducer is pressed, whose moving direction is regulated by a guiding part of the fixing member to a first direction, and which is driven by the elliptical vibration of the first transducer and moves in the first direction with respect to the fixing member;
   a second transducer which is retained by the first mobile body including a second retaining part and generates an elliptical vibration in a driving part when a voltage of a predetermined frequency is applied; and
   a second mobile body to which the driving part of the second transducer is pressed, whose moving direction is regulated by a guiding part of the first mobile body to a second direction which is different from the first direction, and which is driven by the elliptical vibration of the second transducer and moves in the second direction with respect to the first mobile body; wherein
   at least one of the first mobile body and the second mobile body includes
      a first mobile body part which is formed in a desired size and is formed of one of a resin material, aluminum, and magnesium, and
      a second mobile body part which has a sliding part with which the driving part is in contact, and a guide-receiving part which is provided opposite the sliding part and whose moving direction is guided in engagement with the guiding part, the second mobile body part being of higher rigidity, formed in a smaller size than the first mobile body part, and fixed to the first mobile body part.

6. The driving apparatus according to claim 5, wherein a moving direction of the first mobile body part which moves with second mobile body part is guided by an engagement between the guiding part of the fixing member and the guide-receiving part of the second mobile body part.

7. The driving apparatus according to claim 5, further comprising a biasing unit which biases the transducer so that the driving part is pressed to the sliding part from a side across the second mobile body part and the transducer from the guiding part.

8. The driving apparatus according to claim 5, further comprising:
   a rolling body arranged between the guiding part and the guide-receiving part in line along the moving direction, and
   another rolling body for positioning which is provided at a position away from the guiding member in a direction different from the moving direction of the guiding member in a state of being between the first mobile body part and the fixing member with a biasing force.

* * * * *